US012420305B2

(12) United States Patent
Turner

(10) Patent No.: US 12,420,305 B2
(45) Date of Patent: Sep. 23, 2025

(54) COATING PROCESS FOR ENGINEERED-WOOD PANELS OR COMPONENTS

(71) Applicant: LOUISIANA-PACIFIC CORPORATION, Nashville, TN (US)

(72) Inventor: Heidi Turner, Nashville, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 16/992,002

(22) Filed: Aug. 12, 2020

(65) Prior Publication Data

US 2021/0046504 A1 Feb. 18, 2021

Related U.S. Application Data

(60) Provisional application No. 62/885,383, filed on Aug. 12, 2019.

(51) Int. Cl.

| | |
|---|---|
| ***B05C 1/06*** | (2006.01) |
| ***B05C 1/08*** | (2006.01) |
| ***B05C 11/02*** | (2006.01) |
| ***B05D 1/28*** | (2006.01) |
| *B05C 1/02* | (2006.01) |
| *B05C 9/14* | (2006.01) |

(52) U.S. Cl.

CPC .............. *B05D 1/28* (2013.01); *B05C 1/0808* (2013.01); *B05C 11/025* (2013.01); *B05C 1/025* (2013.01); *B05C 1/06* (2013.01); *B05C 1/0817* (2013.01); *B05C 9/14* (2013.01); *B05C 11/021* (2013.01)

(58) Field of Classification Search

None

See application file for complete search history.

(56) References Cited

U.S. PATENT DOCUMENTS

| | | | | |
|---|---|---|---|---|
| 1,860,664 A * | 5/1932 | Edgecumbe | B05C 1/06 | 427/397 |
| 2,348,817 A * | 5/1944 | Irvine | D21J 1/00 | 118/325 |
| 2,642,030 A * | 6/1953 | Brink | B28B 11/04 | 118/104 |

(Continued)

FOREIGN PATENT DOCUMENTS

| | | |
|---|---|---|
| JP | 09-141660 A | 6/1997 |
| JP | 2013166225 A | 8/2013 |

OTHER PUBLICATIONS

International Search Report and Written Opinion, PCT/US20/046022, Louisiana-Pacific Corporation (international filing date Aug. 12, 2020).

*Primary Examiner* — Binu Thomas

(74) *Attorney, Agent, or Firm* — Wayne Edward Ramage; Baker Donelson

(57) ABSTRACT

An apparatus and method of applying a finish or paint coating in a prefinishing or finishing line to a fencing panel or picket that disguises the screen-back texture of the engineered wood substrate. After paint or similar coating is applied (such as by one or more spray nozzles) to a face to a fence picket or fencing product or component, the fence picket passes under a roller, brush, or roller brush or similar paint applicator while the paint is still wet. The roller/brush removes some of the paint and applies an angled pattern to the face, which disguises the screen-back texture of the substrate.

12 Claims, 3 Drawing Sheets

(56) References Cited

U.S. PATENT DOCUMENTS

| | | | | | |
|---|---|---|---|---|---|
| 2,971,856 | A | | 2/1961 | Lauring | |
| 3,679,790 | A | * | 7/1972 | Alfsen | B27N 7/00 425/363 |
| 3,693,585 | A | * | 9/1972 | Reeve | B05C 1/025 118/224 |
| 4,040,384 | A | * | 8/1977 | Lattner | B05C 11/023 118/325 |
| 4,741,783 | A | * | 5/1988 | Daunheimer | B08B 1/008 15/88.4 |
| 5,378,307 | A | * | 1/1995 | Bard | B05B 14/00 156/345.21 |
| 6,613,147 | B1 | * | 9/2003 | Nieto | B05B 13/0207 118/316 |
| 8,230,804 | B1 | * | 7/2012 | Barbieri | B05C 1/025 118/224 |
| 2012/0111365 | A1 | * | 5/2012 | Kunze | B05C 3/09 134/122 R |
| 2014/0287145 | A1 | * | 9/2014 | Brown | B32B 3/30 427/300 |

* cited by examiner

COATING PROCESS FOR ENGINEERED-WOOD PANELS OR COMPONENTS

This application claims benefit of and priority to U.S. Provisional Application No. 62/885,383, filed Aug. 12, 2019, which is incorporated herein in its entirety by specific reference for all purposes.

FIELD OF INVENTION

This invention relates to a coating process and system for an engineered fence panel or pickets comprising engineered wood components.

BACKGROUND OF INVENTION

In several exemplary embodiments, the present invention comprises a method of applying a finish or paint coating in a prefinishing process for a fencing panel or picket that disguises the screen-back texture of the manufactured wood substrate. The panels or pickets are conveyed on a line through one or more paint/coating machines or booths, where a paint or similar coating is applied by brush or spray application (e.g., by one or more spray nozzles), to one or more surfaces of the panel or picket. Paint/coating may be applied to a single surface or multiple surfaces at the same time, or at different times by the same booth/machine or via different booths or machines on the prefinishing line.

As seen in FIG. 1, after paint or similar coating is applied (such as by one or more spray nozzles) to a face of the panel or picket, or other fencing product, (such as, for example, the screen-back patterned face on the manufactured wood substrate), of the fence picket (or fencing product), the picket or panel passes under a roller brush while the paint is still wet. The roller brush removes some of the paint and applies a pattern to the face, which disguises the screen-back texture of the substrate. In several embodiments, no paint is previously applied to the brush; i.e., the brush is not used to apply paint to the picket, just remove some of the paint and apply a pattern.

In several embodiments, the brush is angled with respect to the fence picket. In one exemplary embodiment, the angle ranges from 0 degrees to approximately 45 degrees (with respect to a line across the width of the picket and/or finishing line, which is at right angles to the longitudinal axis of the picket and/or finishing line). In a further exemplary embodiment, the angle ranges from approximately 10 degrees to approximately 25 degrees. In a preferred embodiment, the angle ranges from approximately 12 degrees to approximately 20 degrees. As a result, the brush applies a variable pattern at an angle along the length of the face, with minimal paint flow after brushing. The picket may then pass through an oven or drying station to dry the paint and the pattern on the face.

In several embodiments, a blade or scraper may be positioned along the brush to remove excess paint from the brush as it removes paint from the picket face. The excess paint is metered off one end of the blade, and processed for re-use or disposal.

DETAILED DESCRIPTION OF EXEMPLARY EMBODIMENTS

Engineered wood fencing panels and pickets, and methods of production, are described in U.S. patent application Ser. No. 16/189,995, "Engineered Fence Panels and Process," filed Nov. 13, 2018, which is incorporated herein in its entirety by specific reference for all purposes. The fencing substrate comprises engineered wood products (including, but not limited to, oriented-strand board (OSB), fiber strand, or laminated strand lumber, and the like).

In one exemplary OSB manufacturing process, the substrate is produced with a cedar or similar texture on one side and "screen back" on the other side. The "screen back" texture (e.g., a corrugated or pixilated appearance) is the result of pressing the OSB board with two paper overlays, one on the front and one on the back. The unfinished mat (comprised of paper overlays and resin-rich wood flakes) is conveyed through the manufacturing line on a porous metal screen, including into the industrial press that applies heat and pressure to convert the mat into a unified piece of OSB with paper overlays. During the process of compressing the flakes and paper together, the porous metal screen also gets pressed by the bottom press plate into the back side of the substrate, thereby pressing the screen's pattern into the back of the substrate. This pattern remains in the substrate after subsequent processing, such as cutting the substrate into fence pickets.

Fence panels and pickets often are finished prior to being sold (i.e., prefinished, or pre-painted). Such finishing includes two-tone prefinishing, i.e., where two colors or two distinct color tones are applied. In typical finishing processes, the screen-back appearance described above often is accentuated and becomes more visible due to a semi-transparent topcoat of paint, which is applied to the back of the picket or panel, pooling in the deeper recesses of the screen pattern as the picket or panel travels down the coating line to the finishing oven. Accordingly, there is a need for a prefinishing process for a fencing product with a coating that addresses the screen-back appearance issue without modifying the engineered wood substrate production process.

Figure 1:
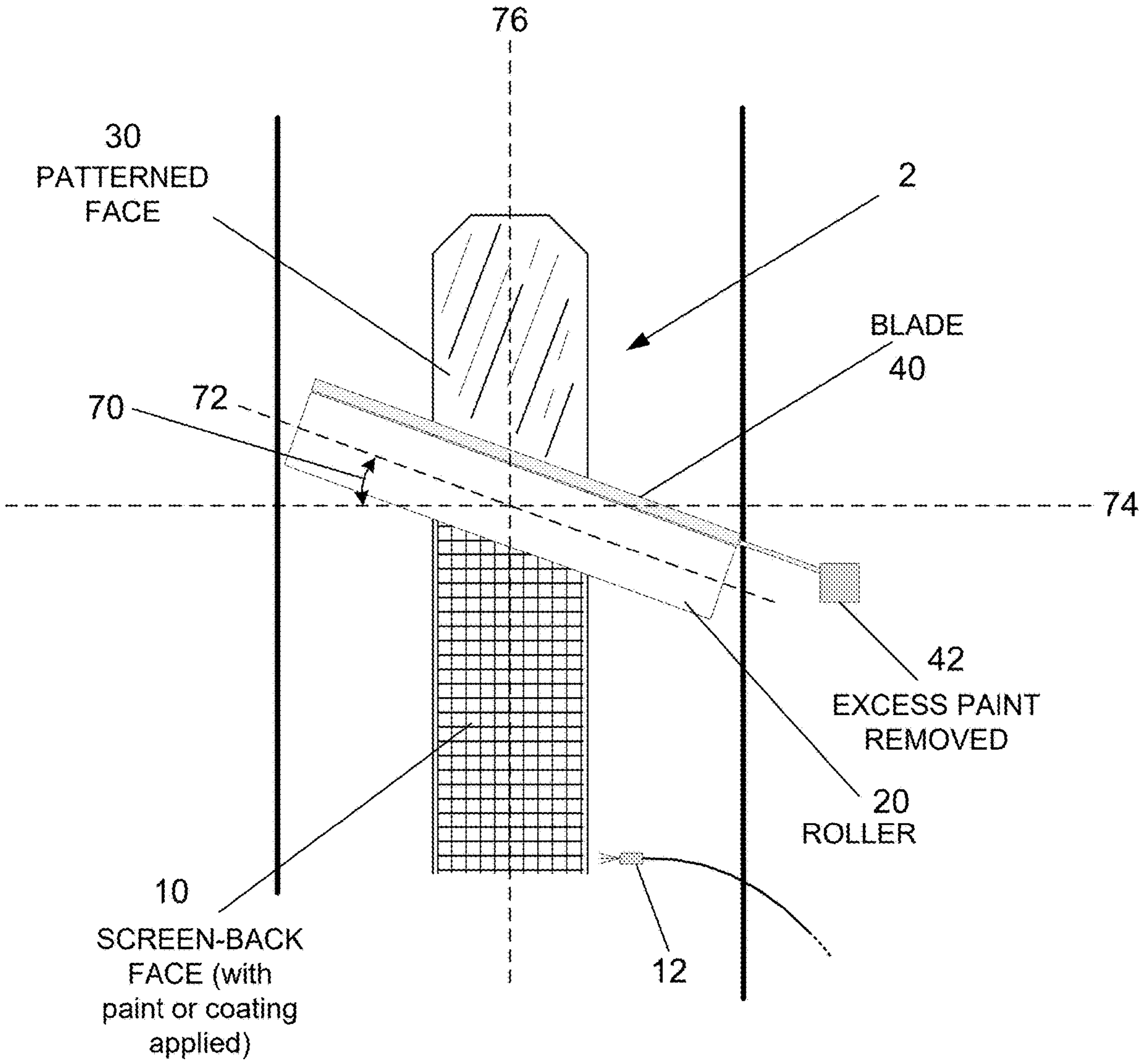
FIG. 1 shows a view of a roller brush station according to an exemplary embodiment of the present invention.
Figure 3:
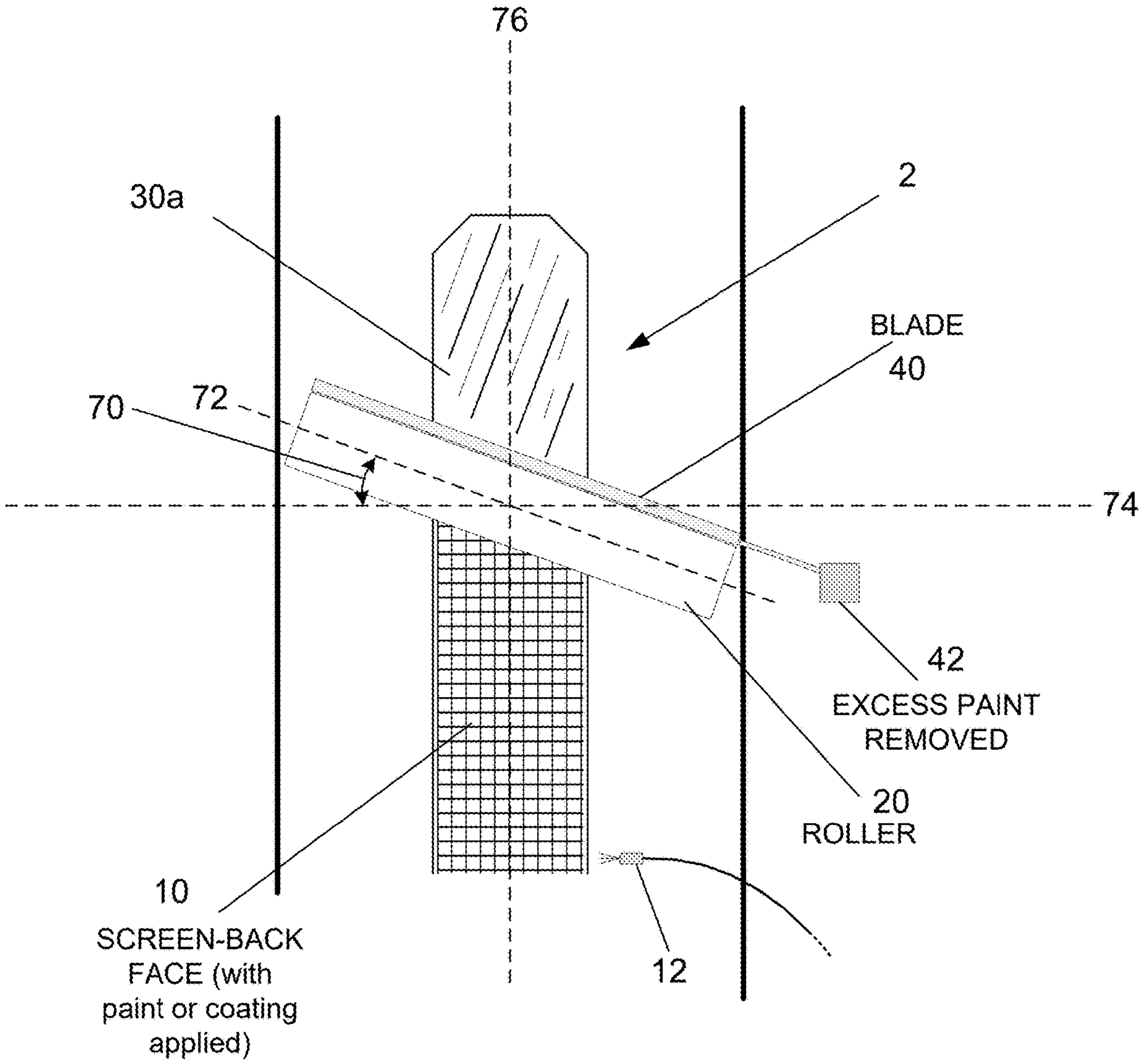
FIG. 3 shows a view of an alternative roller brush station according to another exemplary embodiment of the present invention.

In several exemplary embodiments, the present invention comprises an apparatus and method of applying a finish or paint coating in a prefinishing or finishing process for a fencing panel or picket that disguises the screen-back texture of the substrate. As seen in FIG. 1, in one exemplary embodiment, after paint or similar coating is applied (such as by one or more spray nozzles 12) to a face, e.g., the screen-back patterned face 10, of the fence picket 2 (or fencing product), the fence picket passes under a roller, brush, or roller brush 20 or similar paint applicator while the paint is still wet. The roller/brush 20 removes some of the paint and applies an angled pattern to the face 30, which disguises the screen-back texture of the substrate. In some embodiments, paint may be previously applied to the roller/brush 20, with some paint applied to the screen-back face 30*a*, as seen in FIG. 3. In several embodiments, no paint is previously applied to the roller/brush; i.e., the roller/brush is not used to apply paint to the picket, just remove some of the paint and apply a pattern.

As seen in FIG. 1, the roller/brush is angled with respect to the fence picket as the fence picket passes under the roller/brush on the finishing line. In one exemplary embodiment, the angle 70 ranges from 0 degrees to approximately 45 degrees (i.e., the longitudinal axis 72 of the roller/brush with respect to a line or lateral axis 74 across the width of the picket and/or finishing line, which is at right angles to the longitudinal axis 76 of the picket and/or finishing line). In a further exemplary embodiment, the angle ranges from approximately 10 degrees to approximately 25 degrees. In a preferred embodiment, the angle ranges from approximately 12 degrees to approximately 20 degrees. As a result, the roller/brush applies a variable pattern at an angle along the length of the face, with minimal paint flow after brushing. In particular, the variable length and spacing of the linear aspects of the variable pattern applied by the roller/brush disguises the more orthogonal patterning caused by the standard application of paint to the screen-back face. The angle affects the effectiveness of the "disguising" effect to a person viewing the picket as installed (i.e., with the picket longitudinal axis vertical). The picket may then pass through an oven or drying station to dry the paint and the angled pattern on the face.

The angle of the brush/roller generally results in a complementary angle for the angle of the linear elements of the angled pattern with respect to the lateral axis of the picket. Accordingly, the angle of the linear elements of the angled pattern with respect to the longitudinal axis of the picket is generally the same as the roller/brush angle described above. The angle(s) of the linear elements often will not be exact due to the variability in movement of individual brush or roller elements as the picket passes underneath. This variability promotes the "disguising" effect described herein.

In several embodiments, a blade or scraper 40 may be positioned along the roller brush 20 to remove excess paint from the brush as it removes paint from the picket face. The excess paint is metered off one end of the blade, and processed for re-use or disposal.

Patterning using the angled brush may be applied to a single face of the picket (e.g., the screen-back side), or to both faces. First, paint (primer/sealer) coating is sprayed on the side edges and ends of the picket. In some embodiments, multiple layers or increased thicknesses of paint (primer/sealer) coating may be applied in some areas, such the bottom and top ends, or along the edges of any dog-ears. After drying, a base coat may be applied to each face and all edges, with the first face and edges dried before flipping the picket and application of the base coat to the second face and edges. The top-coat or patterned paint or coating then is sprayed on the first or second face and edges of the picket at a paint booth or station, and passes under a brush station as described above, where the pattern is applied by the roller brush, and then dried in an oven. After drying, the picket is flipped, and the opposite face is painted at a paint booth or station. If the opposite face is also to be patterned, the picket then passes under a brush station as described above. After drying, the picket is then further processed and packaged as needed.

Figure 2:
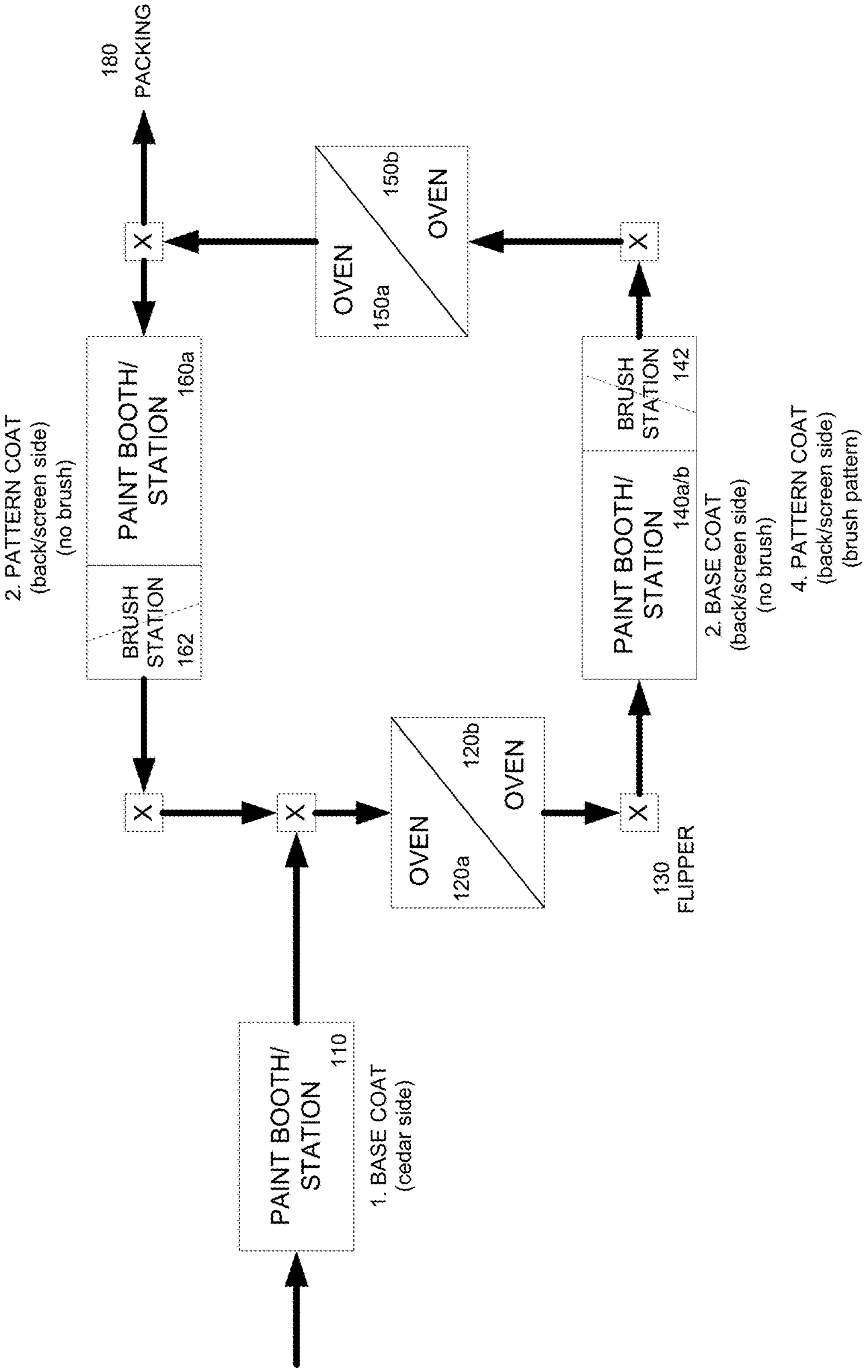
FIG. 2 shows a view of a dual-face prefinishing processing line with multiple roller brush stations.

FIG. 2 shows an example of a "stacked" prefinishing line where both faces are treated with a series of stacked ovens and stacked paint booths/stations. After applying paint to the edges and ends of the pickets, the first face (which may be the cedar or embossed side) receives a base coat by standard application at a paint booth/station 110, is dried in an oven 120*a*, and then flipped 130 to the second face (which may be the screen-back face), which similarly receives a base coat by standard application (without brushing) at a paint booth/station 140*a*, and is dried in an oven 150*a*. The picket then proceeds to a paint booth/station 160*a* with accompanying brush station 162 for applying a coating layer by standard application over the base layer on the second face, followed by applying a pattern with a roller/brush (as described above) to the second face. The picket is then is dried in an oven 120*b* (stacked with oven 120*a*), and flipped 130 so the first side is up. The picket then proceeds to paint booth/station 140*b* (which may be stacked with paint booth/station 140*a*) with accompanying brush station 142 for applying a coating layer by standard application over the base layer on the first face, and then applying a pattern to the first (e.g., cedar-textured pattern) face with a roller/brush (as described above). The picket then is dried in oven 150*b* (which may be stacked with oven 150*a*), and then sent for further processing/packaging 180. A finishing line as described above may have independent units spaced appropriately, or, as shown, multiple ovens may be stacked so that heat is shared between ovens in the stack for greater operational efficiency. Similarly, paint booths/stations may be stacked for operational efficiencies.

Accordingly, the present invention provides an exterior, engineered fence picket or panel with enhanced durability, weather-resistance, fade resistance, and a single- or dual-sided aesthetic appearance at a lower cost and faster installation as compared to prior art fences and materials.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus for applying paint or coating to a wood or engineered-wood panel or component on a prefinishing or finishing line, comprising:

one or more first applicators configured to apply a coating or paint to a top face of a wood or an engineered-wood panel or component conveyed on the prefinishing or finishing line with a direction of travel and a lateral axis orthogonal to the direction of travel; and a second applicator with a longitudinal axis, said second applicator extending across the prefinishing or finishing line at an acute first angle with respect to said lateral axis, and configured to apply an angled pattern with linear elements at an approximate second angle with respect to the direction of travel in the applied coating or paint as the wood or engineered-wood panel or component moves past the second applicator on the prefinishing or finishing line;

wherein the second applicator comprises a roller, brush or roller brush that comes into contact with the applied coating or paint on the face of the wood or engineered-wood panel or component; and wherein additional paint or coating is applied by the second applicator.

2. The apparatus of claim 1, wherein the wood or engineered-wood panel or component has a lateral axis orthogonal to the direction of travel.

3. The apparatus of claim 1, wherein the first angle is in a range of approximately 10 degrees to approximately 25 degrees.

4. The apparatus of claim 1, wherein the wood or engineered-wood panel or component is a fence picket.

5. The apparatus of claim 1, wherein the second angle of the linear elements with respect to the direct of travel is the same as the first angle of the second applicator with respect to the lateral axis.

6. The apparatus of claim 5, further comprising an orthogonal grid pattern in the upper surface of the panel or component, said grid pattern comprising a first set of linear elements parallel to the direction of travel, and a second set of linear elements orthogonal to the first set of linear elements.

7. The apparatus of claim 6, wherein the linear elements of the angled pattern are not parallel to or orthogonal to the first set and second set of linear elements in said grid pattern.

8. The apparatus of claim 1, wherein the first angle is in a range of approximately 12 degrees to approximately 20 degrees.

9. The apparatus of claim 1, wherein the second applicator comprises a single roller that extends across a width of the engineered-wood panel or component being conveyed.

10. The apparatus of claim 9, wherein the single roller does not move laterally with respect to the face of the engineered-wood panel or component being conveyed.

11. The apparatus of claim 9, further comprising a blade positioned along the length of the roller.

12. The apparatus of claim 11, wherein the blade is in contact with the roller, and is configured to remove excess paint from the roller.

* * * * *